(12) United States Patent
Hong et al.

(10) Patent No.: US 8,029,945 B2
(45) Date of Patent: *Oct. 4, 2011

(54) METHOD OF PREPARING METAL CATALYST AND ELECTRODE INCLUDING THE SAME

(75) Inventors: Suk-gi Hong, Yongin-si (KR); Duck-young Yoo, Yongin-si (KR); Jung-ock Park, Yongin-si (KR); Woo-sung Jeon, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 637 days.

This patent is subject to a terminal disclaimer.

(21) Appl. No.: 11/703,131

(22) Filed: Feb. 7, 2007

(65) Prior Publication Data
US 2007/0184335 A1 Aug. 9, 2007

(30) Foreign Application Priority Data
Feb. 7, 2006 (KR) .................. 10-2006-0011836

(51) Int. Cl.
*H01M 4/02* (2006.01)
*H01M 4/04* (2006.01)

(52) U.S. Cl. ........ 429/524; 429/531; 429/525; 429/526; 429/527; 429/528; 502/101; 502/300; 427/115

(58) Field of Classification Search .............. 427/115; 429/42, 44; 502/300, 101; *H01M 4/02, 4/04*
See application file for complete search history.

(56) References Cited

U.S. PATENT DOCUMENTS
| | | | |
|---|---|---|---|
| 4,287,232 A * | 9/1981 | Goller et al. .............. 427/113 |
| 6,645,660 B2 | 11/2003 | Datz et al. | |
| 6,946,211 B1 * | 9/2005 | Bjerrum et al. ............. 429/33 |
| 2003/0022055 A1 * | 1/2003 | Menashi ................ 429/44 |
| 2004/0067409 A1 * | 4/2004 | Tanaka et al. ............ 429/42 |
| 2004/0166397 A1 * | 8/2004 | Valdez et al. ............ 429/44 |

FOREIGN PATENT DOCUMENTS
| | | |
|---|---|---|
| CN | 1186838 C | 1/2005 |
| CN | 1776945 A | 5/2006 |
| JP | 02-072560 | 3/1990 |
| JP | 05-234599 | 9/1993 |
| JP | 08-203536 | 8/1996 |
| JP | 2002-246034 | 8/2002 |
| JP | 2004-209468 | 7/2004 |

OTHER PUBLICATIONS

Certificate of Patent issued by Chinese Patent Office in Chinese Patent Application No. 200610171275.7 on Aug. 12, 2009.
Japanese Office Action dated Dec. 15, 2009, issued in corresponding Japanese patent application.

* cited by examiner

*Primary Examiner* — Melvin Mayes
*Assistant Examiner* — Jun Li
(74) *Attorney, Agent, or Firm* — Lee & Morse, P.C.

(57) ABSTRACT

A method of preparing a metal catalyst including a conductive catalyst material and a coating layer formed of a water repellent material on the surface of the conductive catalyst material includes: obtaining a water repellent material solution by mixing a water repellent material and a first solvent; obtaining a conductive catalyst solution by mixing a conductive catalyst material and a first solvent; mixing the water repellent material solution and the conductive catalyst solution; casting the result onto a supporter, drying the cast result and then separating a metal catalyst in a solid state from the supporter; and pulverizing and sieving the product. Also provided is a method of preparing an electrode including the metal catalyst.

9 Claims, 3 Drawing Sheets

METHOD OF PREPARING METAL CATALYST AND ELECTRODE INCLUDING THE SAME

CROSS-REFERENCE TO RELATED APPLICATIONS

This application claims the benefit of Korean Application No. 2006-11836, filed on Feb. 7, 2006, in the Korean Intellectual Property Office, the disclosure of which is incorporated herein by reference.

BACKGROUND OF THE INVENTION

1. Field of the Invention

Aspects of the present invention relate to a method of preparing a metal catalyst and an electrode including the same, and more particularly, to a method of preparing a metal catalyst having excellent efficiency obtained by efficiently controlling an electrolyte around the catalyst and an electrode having excellent performance obtained by including the metal catalyst.

2. Description of the Related Art

A solid polymer electrolyte type fuel cell operating at a high temperature typically uses a polybenzimidazole electrolyte membrane containing phosphoric acid as an electrolyte. Such a fuel cell uses phosphoric acid as a proton transferring medium, and is thus similar in operation to a liquid electrolyte type fuel cell, such as a phosphoric acid type fuel cell or a molten carbonate fuel cell. Accordingly, as in liquid electrolyte type fuel cells, it is difficult to control the distribution and movement of a liquid electrolyte in an electrode of a solid polymer electrolyte type fuel cell operating at a high temperature.

To easily control the distribution and movement of a liquid electrolyte in an electrode of a conventional liquid electrolyte type fuel cell, polytetrafluoroethylene is used as a binder, or the pore size of an electrode is regulated.

However, even when these remedies are used, catalysts in the electrode may not be used efficiently.

SUMMARY OF THE INVENTION

Aspects of the present invention provide a method of preparing a metal catalyst having excellent efficiency obtained by efficiently controlling an electrolyte around the metal catalyst in an electrode, an electrode including the metal catalyst, a method of preparing the electrode, and a fuel cell employing the electrode.

According to an aspect of the present invention, there is provided a method of preparing a metal catalyst including a conductive catalyst material and a coating layer formed of a water repellent material on the surface of the conductive catalyst material, the method including: obtaining a water repellent material solution by mixing the water repellent material and a first solvent; obtaining a conductive catalyst solution by mixing the conductive catalyst material and the first solvent; mixing the water repellent material solution and the conductive catalyst solution; casting the mixed water repellent material solution and conductive catalyst solution onto a supporter, drying the cast result and then separating a metal catalyst in a solid state from the supporter; and pulverizing and sieving the separated metal catalyst.

According to another aspect of the present invention, there is provided a metal catalyst prepared using the method described above.

According to another aspect of the present invention, there is provided a metal catalyst comprising a conductive catalyst material and a coating layer of a water repellent material on surfaces of the conductive catalyst material.

According to another aspect of the present invention, there is provided a method of preparing an electrode including: obtaining a composition for forming a catalyst layer by mixing a metal catalyst prepared using the method described above with a binder and a second solvent; coating the composition for forming the catalyst layer on an electrode supporter and drying the composition for forming the catalyst layer; and treating the dried composition for forming the catalyst layer with an acid solution.

According to another aspect of the present invention, there is provided an electrode prepared using the method described above and a fuel cell employing the electrode.

According to another aspect of the present invention, there is provided a fuel cell comprising: a cathode; an anode; and an electrolyte membrane interposed between the cathode and the anode, wherein at least one of the cathode and anode includes a metal catalyst comprising a conductive catalyst material and a coating layer of a water repellent material on surfaces of the metal catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
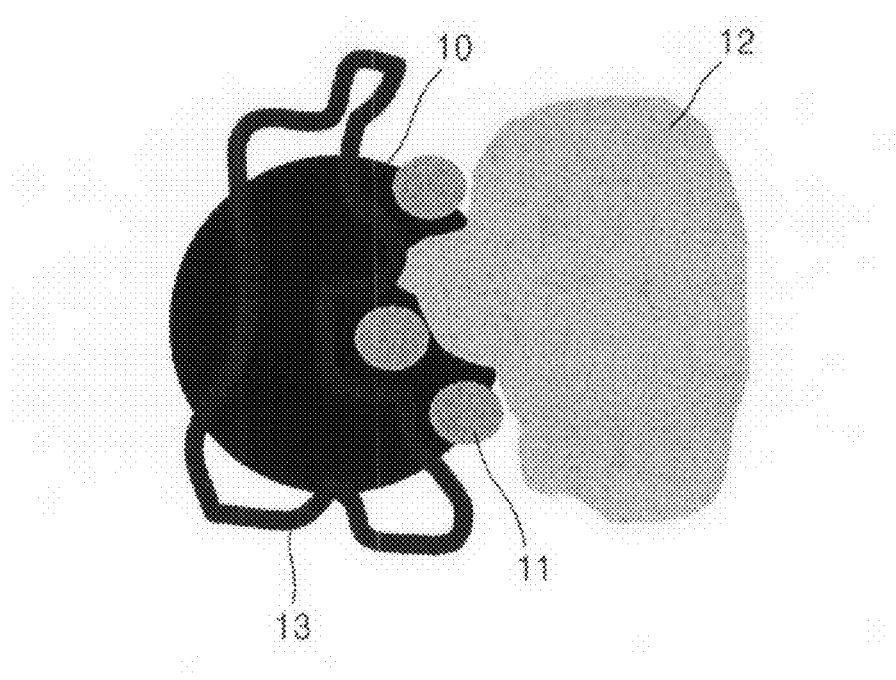
FIGS. 1A and 1B are schematic diagrams of a metal catalyst according to an embodiment of the present invention and a conventional metal catalyst, respectively.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A metal catalyst according to an embodiment of the present invention includes a conductive catalyst material, a coating layer formed of a water repellent material on the surface of the conductive catalyst material, and a liquid electrolyte such as phosphoric acid. Such a structure prevents the metal catalyst from sinking into or being engulfed by the liquid electrolyte when an electrolyte membrane is formed thinly and uniformly on the metal catalyst. Accordingly, the dissolution of gas reactants is accelerated, ensuring excellent efficiency of the metal catalyst. Also, cell performance is improved by a catalyst layer employing the metal catalyst.

The water repellent material may include at least one material selected from the group consisting of a 2,2-bistrifluoromethyl-4,5-difluoro-1,3-dioxol tetra fluoroethylene copolymer, polytetra fluoroethylene, fluoridized ethylene propylene, polyvinylidenefluoride, and FLUOROSARF (manufactured by Fluoro Technology).

When a 2,2-bistrifluoromethyl-4,5-difluoro-1,3-dioxol tetrafluoroethylene copolymer is selected as the water repellent material, TEFLON 2400 (manufactured by DuPont) may be used. A 2,2-bistrifluoromethyl-4,5-difluoro-1,3-dioxol tetrafluoro ethylene copolymer is water repellent and porous, and thus, when coated on the surface of a catalyst layer, prevents phosphoric acid from flooding of the catalyst layer and forms a path for oxygen to move to the catalyst layer.

The amount of the water repellent material in the coating layer may be in the range of 1 to 50 parts by weight based on 100 parts by weight of the conductive catalyst material. When the amount of the water repellent material is less than 1 part by weight, the water repellency may not be sufficient, resulting in catalysts that sink in the liquid electrolyte such as phosphoric acid. Accordingly, the efficiency of the metal catalyst may deteriorate. When the amount of the water repellent material is greater than 50 parts by weight, the water repellency may be too high, blocking the liquid electrolyte. Accordingly, the efficiency of the metal catalyst may be low and electrical resistance may increase.

The conductive catalyst material may be selected from the group consisting of platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), a mixture thereof, an alloy thereof, and carbon containing the same.

As non-limiting examples, the conductive catalyst material may be a carbon platinum/carbon (Pt/C) catalyst and the water repellent material may be FLUOROSARF.

The structure of the metal catalyst according to an embodiment of the present invention will now be described with reference to FIG. 1A. Here, a platinum/carbon (Pt/C) catalyst is used as the conductive catalyst material and FLUOROSARF is used as the water repellent material.

In the metal catalyst, platinum particles 11 are formed on the surface of carbon 10 and a water repellent material 13 is coated on the resulting structure. Also, the surface of the metal catalyst where the repellent material 13 is not coated is covered with phosphoric acid 12.

Figure 1B:
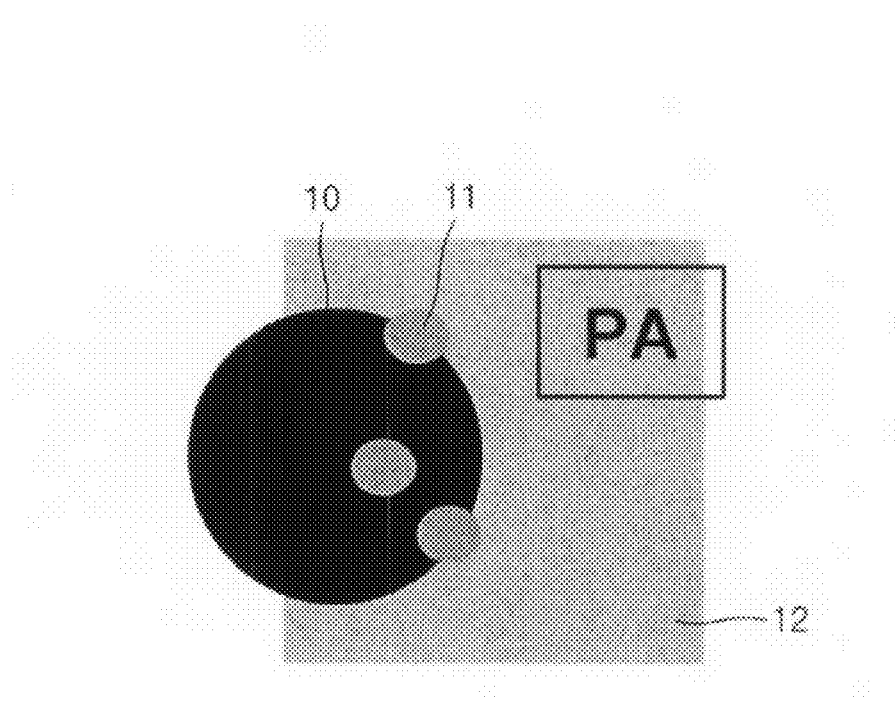

FIG. 1B is a schematic diagram of a conventional metal catalyst.

Referring to FIG. 1B, platinum particles 11 are formed on the surface of carbon 10 and phosphoric acid 12 is formed or is present near the surface of the carbon 10. When the metal catalyst has such a structure, the metal catalyst sinks into the phosphoric acid 12, deteriorating the efficiency of the metal catalyst.

Hereinafter, a method of preparing a metal catalyst according to an embodiment of the present invention and an electrode including the metal catalyst will be described.

Figure 2:
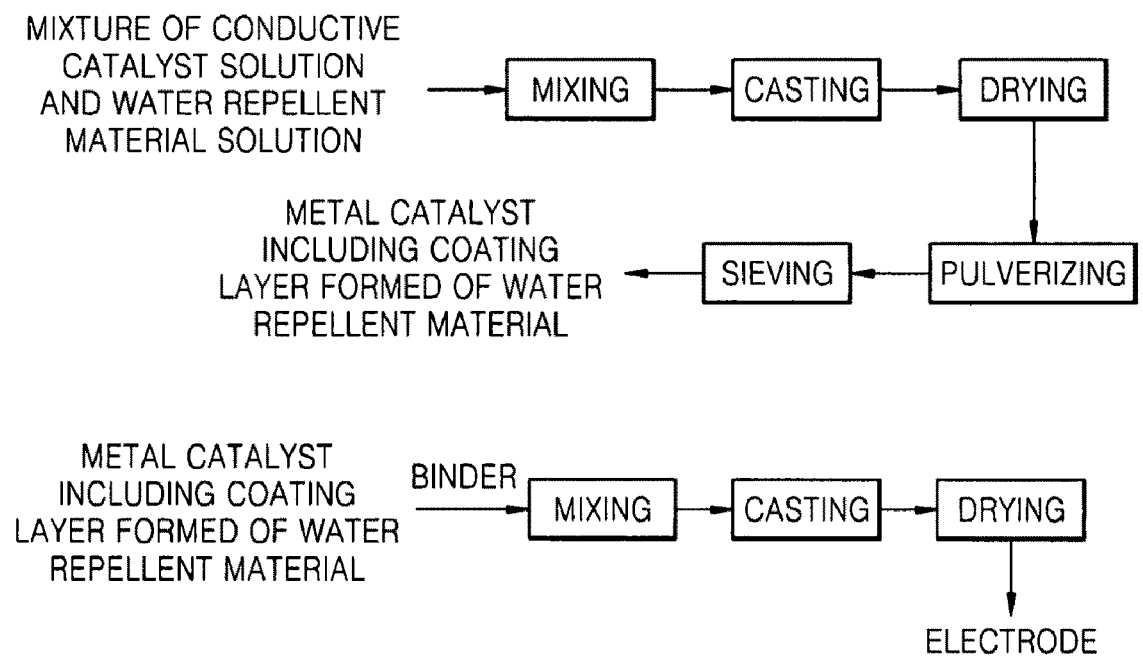
FIG. 2 is a flow chart illustrating a preparation method of a metal catalyst and an electrode according to an aspect of the present invention.

FIG. 2 is a flow chart illustrating a method of preparing an electrode according to an embodiment of the present invention.

Referring to FIG. 2, a conductive catalyst solution and a water repellent material solution are respectively obtained by separately dissolving a conductive catalyst material and dispersing a water repellent material in a first solvent.

The first solvent should have good solubility for a water repellent material and good dispersibility for a conductive catalyst material. Examples of the first solvent include water, hydrofluoropolyester, N-methylpyrrolidone, dimethylacetamide, dimethylformamide, trifluoroacetic acid, etc. The amount of the first solvent used to disperse the conductive catalyst material may be in the range of 200 to 1,000 parts by weight based on 100 parts by weight of the conductive catalyst material. Also, the amount of the first solvent used to dissolve the water repellent material may be in the range of 500 to 1,500 parts by weight based on 100 parts by weight of the water repellent material. When the amount of the first solvent is not in the above range, the conductive catalyst material and the water repellent material may not be uniformly dissolved or dispersed.

The water repellent material solution and the conductive catalyst material are mixed together and the mixture is cast onto a supporter and then dried to obtain a water repellent metal catalyst in a solid state. Here, the supporter may be a TEFLON sheet, a glass substrate, a polyethylene film, a polyethylene terephthalate film, etc.

When the mixture cast onto the supporter is dried, the temperature may be in the range of 60 to 150° C. When the temperature is less than 60° C., the mixture may not dry well. When the temperature is greater than 150° C., the carbon carrier may oxidize.

The water repellent metal catalyst is separated from the supporter to be pulverized and then sieved. Accordingly, a metal catalyst including a coating layer formed of a water repellent material having an average particle size in a predetermined range is obtained. Here, the average particle size may be 1 µm or less, and, as a more particular, non-limiting example, may be in the range of 10 to 100 nm.

A discontinuous porous coating layer or a continuous coating layer is formed on the surface of the Pt/C catalyst according to the concentration of the water repellent material. That is, when the concentration of the water repellent material is high, a continuous coating layer is formed. However, when the amount of the water repellent material is less than about 30-35 wt % relative to the water repellent material, a discontinuous porous coating layer is formed.

The metal catalyst is mixed with a binder and a second solvent, and the mixture is cast onto a gas diffusion layer. An electrode is obtained by drying the cast result. Here, carbon paper, carbon cloth, or the like may be used as an electrode supporter.

Examples of the binder include polyvinylidenefluoride, a vinylidenefluoride-hexafluoropropylene copolymer, etc. The amount of the binder may be in the range of 1 to 10 parts by weight based on 100 parts by weight of the metal catalyst. When the amount of the binder is outside of this range, a catalyst layer may not be formed or the conductivity may be low.

The type and amount of the second solvent depends on the type and amount of the binder. The second solvent may include at least one material selected from the group consisting of N-methylpyrrolidone, dimethylacetamide, dimethyl formamide, and trifluoroacetic acid. Also, the amount of the second solvent is in the range of 100 to 500 parts by weight based on 100 parts by weight of the metal catalyst.

The electrode may be doped with an acid, such as, for example, phosphoric acid. When the electrode is doped with the acid, the metal catalyst is prevented from sinking into the acid, and a thin electrolyte membrane is formed on the metal catalyst. Accordingly, the dissolution of gas reactants is accelerated, improving the efficiency of the metal catalyst.

The metal catalyst according to the present embodiment is stable, especially at high temperatures, and can easily supply oxygen to an electrode. Using such a metal catalyst, an electrode and a fuel cell having improved performances can be obtained.

Hereinafter, a fuel cell according to an embodiment of the present invention will be described in detail.

Figure 4:
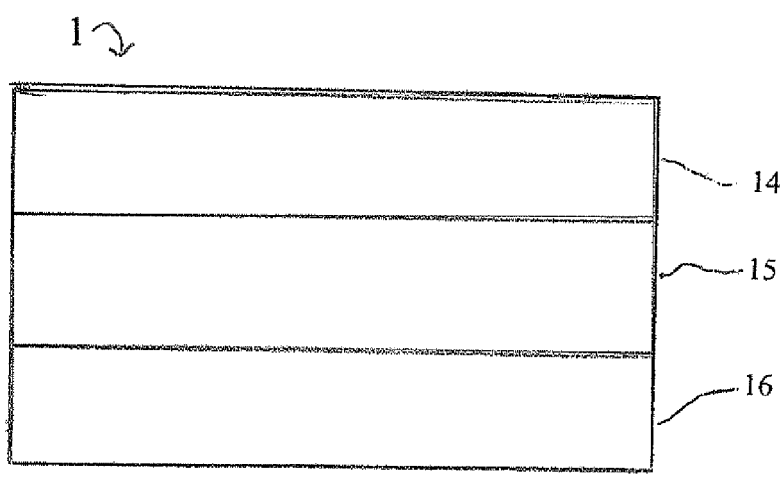
FIG. 4 is a schematic representation of a fuel cell.

As shown schematically in FIG. 4, the fuel cell 1 includes a cathode 14, an anode 16 and an electrolyte membrane 15 interposed between the cathode 14 and the anode 16. Here, at least one of the cathode 14 and anode 16 includes a metal catalyst including a water repellent coating layer according to an embodiment of the present invention.

The fuel cell may be, for example, a phosphoric acid fuel cell, a proton exchange membrane fuel cell, or a direct methanol fuel cell. The structure and manufacturing method of the fuel cell is not specifically limited, and detailed examples are described in various documents. Therefore, a detailed description of the fuel cell is omitted.

The fuel cell may operate at a temperature in the range of 60 to 200° C.

Aspects of the present invention will now be described in further detail with reference to the following examples. These examples are for illustrative purposes only, and are not intended to limit the scope of the present invention.

EXAMPLE 1

5 Parts by Weight of a Water Repellent Material Based on 100 Parts by Weight of a Conductive Catalyst Material 0.05 g of FLUOROSARF (manufactured by Fluoro Technology), as a water repellent material, was mixed with 10 ml of hydrofluoropolyester and the mixture was stirred at 500 RPM for 30 minutes at room temperature to prepare a water repellent material solution.

Separately, 1.0 g of Pt/C was mixed with 10 ml of hydrofluoropolyester and the mixture was stirred at 500 RPM for 10 minutes at room temperature to prepare a Pt/C solution.

The water repellent material solution and the Pt/C solution were mixed while being exposed to ultrasonic waves. The mixture was cast onto a TEFLON sheet and then dried at 120° C.

Subsequently, a metal catalyst in a solid state was separated from the Teflon sheet to be pulverized and then sieved. Through the sieving, a Pt/C catalyst including a coating layer formed of FLUOROSARF, a water repellent material having an average particle size of 1 µm or less, was obtained.

1 g of the Pt/C catalyst including the coating layer formed of FLUOROSARF was mixed with 0.025 g of polyvinylidenefluoride, as a binder, and 5 ml of N-methylpyrrolidone, as a solvent, and the mixture was stirred for about 30 minutes at room temperature to obtain a slurry for forming a catalyst layer.

The slurry was coated on carbon paper using an applicator (gap: about 120 µm). The result was dried at 80° C. for 1 hour, at 120° C. for 30 minutes, and then at 150° C. for ten minutes to prepare an electrode.

The electrode was treated with phosphoric acid to form a fuel cell. The fuel cell included a cathode containing the Pt/C catalyst, an anode and a polybenzimidazole electrolyte membrane. Also, hydrogen was used as a fuel, and air was used as an oxidizer. Pure hydrogen was supplied to the anode at 100 ml/min and air was supplied to the cathode at 200 ml/min. The unit cell was operated at 150° C.

EXAMPLE 2

15 Parts by Weight of a Water Repellent Material Based on 100 Parts by Weight of a Conductive Catalyst Material A metal catalyst, an electrode, and a fuel cell were prepared in the same manner as in Example 1, except that 0.15 g of FLUOROSARF was used instead of 0.05 g while preparing the water repellent material solution.

COMPARATIVE EXAMPLE 1

1 g of Pt/C catalyst was mixed with 0.05 g of polybenzimidazole and 0.025 g of polyvinylidenefluoride, and the mixture was stirred at room temperature for 30 minutes to obtain a slurry for forming a catalyst layer.

The slurry was coated on carbon paper using an applicator (gap: about 120 µm) and the result was dried at 80° C. for 1 hour, then at 120° C. for 30 minutes, and then at 150° C. for 10 minutes to prepare an electrode.

The electrode was treated with phosphoric acid to form a fuel cell. The fuel cell included a cathode containing the Pt/C catalyst of Comparative Example 1, an anode, and a polybenzimidazole electrolyte membrane. Also, hydrogen was used as a fuel, and air was used as an oxidizer.

Figure 3:
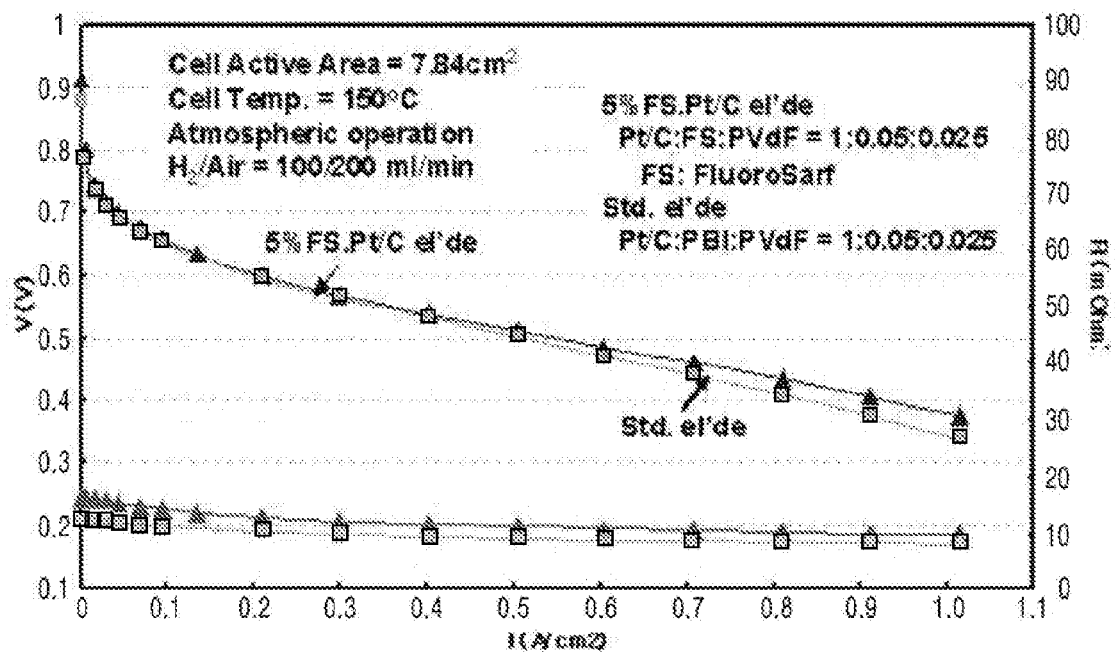
FIG. 3 is a graph illustrating current-voltage (I-V) and current-resistance (I-R) characteristics of electrodes prepared according to Example 1 and Comparative Example 1.

FIG. 3 is a graph illustrating the current-voltage (I-V) and current-resistance (I-R) characteristics of the electrodes prepared according to Example 1 and Comparative Example 1.

In FIG. 3, —▲— is used to indicate the I-V and I-R characteristics of the electrode of Example 1, and —■— is used to indicate the I-V and I-R characteristics of the electrode of Comparative Example 1.

Referring to FIG. 3, the electrode of Example 1 is shown to have superior I-V characteristics in comparison to the electrode of Comparative Example 1, especially in a high current density region. Such superior characteristics are due to the improved diffusion of gas reactants obtained by controlling the electrolyte distribution, which is possible due to the coating layer formed of the water repellent material on the catalyst layer. Also, the electrode of Example 1 has a relatively high resistance. Such a phenomenon may be caused by the coating layer formed of the water repellent material on the surface of the conductive catalyst particle acting as a resistive layer.

An adsorption test was performed on the metal catalysts prepared according to Examples 1 and 2 and Comparative Example 1 to examine the water repellency of the metal catalysts. The results are shown in Table 1. In the adsorption test, a certain quantity of water was poured to flow between the metal catalyst particles, and the amount of water that passed through the metal catalyst particles was measured to obtain the amount of water adsorbed to the metal catalyst particles. The amount of adsorbed water was used to represent the water repellency.

TABLE 1

| Examples (Amount of water repellent material) | Adsorbed water (g) | Amount of adsorbed water (g)/Amount of metal catalyst (g) | Amount of adsorbed water (mol)/Amount of metal catalyst (g) |
|---|---|---|---|
| Example 1 (5 parts by weight) | 3.6122E−06 | 7.1387E−05 | 3.9659E−06 |
| Example 2 (15 parts by weight) | 0.0000E+00 | 0.0000E+00 | 0.0000E+00 |
| Comparative Example 1 (0 parts by weight) | 2.8284E−05 | 5.5568E−04 | 3.0871E−05 |

Referring to Table 1, as the amount of the water repellent material coated on the Pt/C catalyst increased, the amount of water adsorbed decreased. In particular, in the case of Example 2, where the amount of the water repellent material was 15 parts by weight, water was not adsorbed to the metal catalyst particles at all.

Using the method of preparing a metal catalyst according to aspects of the present invention, a metal catalyst including a coating layer formed of a water repellent material on the surface of a conductive catalyst particle can be obtained. Such a metal catalyst does not sink into a liquid electrolyte since the hydrophobicity is efficiently distributed around the conductive catalyst particles. Also, the distribution and movement of the liquid electrolyte, such as phosphoric acid, around the metal catalyst can be controlled. Accordingly, by regulating the interface thickness between the catalyst and the liquid electrolyte, an electrode having an ideal triple phase boundary for electrochemical reactions can be formed. A fuel cell employing the metal catalyst has excellent efficiency and overall performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing a metal catalyst comprising a conductive catalyst material and a coating layer formed of a water repellent material on a surface of the conductive catalyst material, the method comprising:
   obtaining a water repellent material solution by dissolving the water repellent material in a first solvent;
   separately, obtaining a conductive catalyst mixture by mixing the conductive catalyst material and the first solvent;
   mixing the water repellent material solution and the conductive catalyst mixture;
   casting the mixed water repellent material solution and conductive catalyst mixture onto a supporter and drying the cast result to obtain the metal catalyst comprising the conductive catalyst material and a coating layer of the water repellent material formed on a surface of the conductive catalyst material;
   separating the metal catalyst in a solid state from the supporter; and
   pulverizing and sieving the separated metal catalyst, wherein the first solvent comprises at least one material selected from the group consisting of hydrofluoropolyester, N-methylpyrrolidone, dimethylacetamide, dimethylformamide, and trifluoroacetic acid; wherein the water repellent material comprises at least one material selected from the group consisting of 2,2-bistrifluoromethyl-4,5-difluoro-1,3-dioxol tetrafluoroethylene copolymer, polytetrafluoroethylene, fluorinated ethylene propylene, polyvinylidenefluoride, and a fluoropolymer sold under the trademark name FLUOROSARF.

2. The method of claim 1, wherein the amount of the water repellent material is in the range of 1 to 50 parts by weight based on 100 parts by weight of the conductive catalyst material.

3. The method of claim 1, wherein the amount of the first solvent used for the obtaining the water repellent material solution is in the range of 500 to 1,500 parts by weight based on 100 parts by weight of the water repellent material, and the amount of the first solvent used for the obtaining the conductive catalyst mixture is in the range of 200 to 1,000 parts by weight based on 100 parts by weight of the conductive catalyst material.

4. A method of preparing an electrode comprising:
   obtaining a water repellent material solution by dissolving a water repellent material in a first solvent;
   separately, obtaining a conductive catalyst mixture by mixing a conductive catalyst material and the first solvent;
   mixing the water repellent material solution and the conductive catalyst mixture;
   casting the mixed water repellent material solution and conductive catalyst mixture onto a supporter and drying the cast result to obtain a metal catalyst comprising the conductive catalyst material and a coating layer of the water repellent material formed on a surface of the conductive catalyst material;
   separating the metal catalyst in a solid state from the supporter;
   pulverizing and sieving the separated metal catalyst, wherein the first solvent comprises at least one material selected from the group consisting of hydrofluoropolyester, N-methylpyrrolidone, dimethylacetamide, dimethylformamide, and trifluoroacetic acid; wherein the water repellent material comprises at least one material selected from the group consisting of 2,2-bistrifluoromethyl-4,5-difluoro-1,3-dioxol tetrafluoroethylene copolymer, polytetrafluoroethylene, fluorinated ethylene propylene, polyvinylidenefluoride, and a fluoropolymer sold under the trademark name FLUOROSARF;
   mixing the metal catalyst with a binder and a second solvent to obtain a composition for forming a catalyst layer;
   coating the composition for forming the catalyst layer onto an electrode supporter and drying the composition for forming the catalyst layer; and
   treating the dried composition for forming the catalyst layer with an acid solution.

5. The method of claim 4, wherein the binder comprises at least one material selected from the group consisting of polyvinylidenefluoride and vinylidenefluoride-hexafluoropropylene copolymer, and wherein the amount of the binder is in the range of 1 to 10 parts by weight based on 100 parts by weight of the metal catalyst.

6. The method of claim 4, wherein the second solvent comprises a material selected from the group consisting of N-methylpyrrolidone, dimethylacetamide, dimethylformamide, and trifluoroacetic acid.

7. The method of claim 6, wherein the amount of second solvent is in the range of 100 to 500 parts by weight based on 100 parts by weight of the metal catalyst.

8. The method of claim 4, wherein the acid solution comprises a phosphoric acid solution.

9. A method of preparing a metal catalyst comprising a conductive catalyst material and a coating layer formed of a water repellent material on a surface of the conductive catalyst material, the method comprising:
   obtaining a water repellent material solution by dissolving the water repellent material in a first solvent;
   separately, obtaining a conductive catalyst mixture by mixing the conductive catalyst material and the first solvent;
   mixing the water repellent material solution and the conductive catalyst mixture;
   casting the mixed water repellent material solution and conductive catalyst mixture onto a supporter and drying the cast result to obtain the metal catalyst comprising the conductive catalyst material and a coating layer of the water repellent material formed on a surface of the conductive catalyst material;
   separating the metal catalyst in a solid state from the supporter; and
   pulverizing and sieving the separated metal catalyst, wherein the first solvent includes at least one material selected from the group consisting of hydrofluoropolyester, N-methylpyrrolidone, dimethylacetamide, dimethylformamide, and trifluoroacetic acid; wherein the water repellent material includes at least one material selected from the group consisting of 2,2-bistrifluoromethyl- 4,5-difluoro-1,3-dioxol tetrafluoroethylene copolymer, fluorinated ethylene propylene, polyvinylidenefluoride, and a fluoro-polymer sold under the trademark name FLUOROSARF.

* * * * *